(12) United States Patent
Stookey

(10) Patent No.: US 7,449,204 B2
(45) Date of Patent: Nov. 11, 2008

(54) ORAL CARE CHEW PRODUCTS AND METHODS FOR DOMESTIC ANIMALS

(75) Inventor: George K. Stookey, Noblesville, IN (US)

(73) Assignee: Therametric Technologies Inc., Carmel, IN (US)

( * ) Notice: Subject to any disclaimer, the term of this patent is extended or adjusted under 35 U.S.C. 154(b) by 278 days.

(21) Appl. No.: 10/623,145

(22) Filed: Jul. 18, 2003

(65) Prior Publication Data

US 2005/0013898 A1 Jan. 20, 2005

(51) Int. Cl.
*A23K 1/18* (2006.01)

(52) U.S. Cl. .................. 426/2; 426/132; 426/805

(58) Field of Classification Search .......... 426/2, 426/805, 132
See application file for complete search history.

(56) References Cited

U.S. PATENT DOCUMENTS

| 4,044,103 | A | * | 8/1977 | Mollard et al. .......... 423/267 |
| 4,913,895 | A | * | 4/1990 | Miyake et al. .......... 424/57 |
| 4,935,031 | A | * | 6/1990 | Munch et al. .......... 8/94.18 |
| 5,011,679 | A | * | 4/1991 | Spanier et al. .......... 424/57 |
| 5,114,704 | A | * | 5/1992 | Spanier et al. .......... 424/57 |
| 5,296,217 | A | | 3/1994 | Stookey .......... 424/57 |
| 5,820,853 | A | * | 10/1998 | Glandorf .......... 424/52 |
| 6,080,419 | A | | 6/2000 | Stookey .......... 424/442 |
| 6,223,693 | B1 | * | 5/2001 | Perlberg et al. .......... 119/707 |
| 6,350,438 | B1 | * | 2/2002 | Witt et al. .......... 424/53 |
| 6,521,216 | B1 | * | 2/2003 | Glandorf et al. .......... 424/52 |
| 6,824,756 | B2 | * | 11/2004 | Rosenblatt et al. .......... 423/472 |
| 2005/0013898 | A1 | | 1/2005 | Stookey |

OTHER PUBLICATIONS

Tanzer, J.M. and Hageage, G.J., Jr., "Polyphosphate Inhibition of Growth of Plaques Formed by *Streptococci* and Diphtheroids Implicated in Oral Disease," *Infection and Immunity*, Jun. 1970, p. 604-606.

Draus, F.J., Lesniewski, M. and Miklos, F.L., "Pyrophosphate and Hexametaphosphate Effects in In Vitro Calculus Formation," *Archs Oral Biol.*, vol. 15, pp. 893-896, 1970.

Driessens, F.C.M., Verbeeck, R.M.H., "Possible pathways of mineralization of dental plaque," Dept. of Oral Biomaterials, Catholic University, The Netherlands, 1989.

Legeros, Racquel Z. and Shannon, Ira L., "The Crystalline Components of Dental Calculi: Human vs. Dog," *J. Dent. Res.*, vol. 58, No. 12, pp. 2371-2377, Dec. 1979.

Shibata, H. and Morioka, T., "Antibacterial Action of Condensed Phosphates on the Bacterium *Streptococcus mutans* and Experimental Caries in the Hamster," *Arch Oral Biol.*, vol. 27, pp. 809-186, 1982.

Stookey, G.K., Jackson, R.D., Beiswanger, B.B., Stookey, K.R., "Clinical efficacy of chemicals for calculus prevention," pp. 235-258, 1989, Indiana University School of Dentistry, Indianapolis, Indiana.

Abstract, Logan, Ellen I., "Nutrition and Management of Oral Health," World Veterinary Dental Congress Sep. 30, 1994.

Abstract, "The Effects of an Experimental Dentifrice on Calculus", GlaxoSmithKline, Jun. 25, 2003.

Internet pages, www.petco.com/product/8739/Pounce-Tartar-Control, Baste'mms, 2 pages last printed Nov. 26, 2007.

Internet pages, www.petsmart.com/product/index, Pounce Tartar Control Cat Treats, 2 pages last printed Nov. 26, 2007.

Rawlings, J.M., Gorrel, C., Markwell, P.J., "Effect on Canine Oral Health of Adding Chlorhexidine to a Dental Hygine Chew," *J. Vet. Dent.*, vol. 15, No. 3, pp. 129-134, Sep. 1998.

Brown, Wendy Y., McGenity, Phil, "Effective Periodontal Disease Control Using Dental Hygiene Chews," *J. Vet. Dent.*, vol. 22, No. 1, pp. 16-19, Mar. 2005.

US 5,616,516, 04/1997, Stookey. (withdrawn)

* cited by examiner

*Primary Examiner*—C. Sayala
(74) *Attorney, Agent, or Firm*—Woodard, Emhardt, Moriarty, McNett & Henry LLP

(57) ABSTRACT

A chew product useful to reduce dental calculus and gingivitis in the oral cavity of animals contains a combination of sodium tripolyphosphate and a cetyl pyridinium salt. Also disclosed are methods for preparing the novel chew product and for using the chew product to promote oral health in animals.

22 Claims, No Drawings

ORAL CARE CHEW PRODUCTS AND METHODS FOR DOMESTIC ANIMALS

BACKGROUND OF THE INVENTION

The present invention relates generally to agents for promoting oral health in domestic animals such as dogs and cats. More particularly, the invention relates to products such as rawhide to be chewed by animals and including agents that promote oral health.

As further background, dental calculus, commonly known as tartar, is recognized as a recurring calcified deposit that occurs on the surfaces of the teeth of companion animals, particularly domestic dogs and cats. Dental calculus forms as a sequential process that begins with the formation of dental plaque, a biofilm consisting of about 70-75% oral microorganisms with variable amounts of food debris and microbial remnants. Beginning with a clean tooth surface, within seconds following exposure to saliva a thin organic film (dental pellicle) forms on the tooth surface. Within minutes, oral microorganisms colonize the pellicle coating and, utilizing food particles and salivary components of the host, rapidly grow to form a visible deposit (dental plaque) on the tooth surface within a few hours. Within 24 hours some microbial members of the dental plaque die and their cellular remnants serve as foci for calcification. Because saliva is supersaturated with regard to calcium, the presence of such foci serve to initiate the calcification process in the deeper layers of dental plaque. Thus, within 48-72 hours calcified dental plaque (or dental calculus) can be readily detected microscopically in plaque removed from the tooth surface. This process continues with the progressive increase in the extent of the calcified deposit such that it is typically quite visible to the naked eye within 7-10 days and is readily apparent within 3-4 weeks.

The chemical composition of the calcified deposits (calculus) is related to the pH and composition of the saliva of the host. In dogs and cats the saliva has an alkaline pH and a high concentration of carbonate with very little phosphate. As a result, the composition of calculus in companion animals is predominantly calcium carbonate.

Inflammation (gingivitis) of the soft tissues supporting the teeth (gingivae) is primarily due to the presence of bacterial toxins and related microbial by-products. If this process is allowed to continue the inflammation becomes progressively more severe with invasion of the underlying structures and a subsequent resorption of the bone supporting the teeth resulting in tooth loss (periodontitis). The presence of dental calculus on the tooth surface provides an increased surface area for microbial colonization enhancing the rate on additional calculus formation. Large calcium deposits may serve as a physical irritant to the soft tissues supporting the teeth and enhance the inflammatory response (gingivitis). Thus, the presence of dental calculus is recognized as a secondary factor that may exacerbate the development of gingivitis.

The formation of dental calculus can be prevented by scrupulous oral hygiene involving the complete removal of dental plaque each day by meticulous tooth brushing and the use of dental floss. However, such scrupulous oral hygiene rarely occurs in companion animals, and thus other preventive measures are required.

It is known that the provision of a hard particle diet decreases the amount of plaque accumulation in companion animals, as compared to the feeding of moist or canned regimens. This effect is attributed to the mechanical removal of non-calcified dental plaque during mastication and has resulted in the marketing of a variety of biscuit-type products as snack treats for dogs and cats.

In recent years, specific chemicals that reduce the rate of the formation of dental calculus have been incorporated into commercial products and suggested in the literature. Soluble pyrophosphates have been suggested to act as crystal poisons to reduce the formation of calculus and are included in several current commercial products. Sodium hexametaphosphate is a recognized sequestrant and its incorporation into a variety of products has likewise been shown to reduce the formation of dental calculus in dogs and cats. See, e.g., U.S. Pat. No. 5,296,217 issued Mar. 22, 1994. Sodium tripolyphosphate is presently included in several treat-type products for cats and dogs with claims for reductions in calculus formation, although there are no published clinical data to demonstrate such an effect.

Because many pet foods contain phosphoric acid as a palatant and the presence of phosphoric acid inactivates the aforementioned polyphosphates by converting them to orthophosphate, generally, these compounds may only be used on pet food formulations that do not contain phosphoric acid. It has been reported that the use of malic acid on such formulations containing phosphoric acid results in a decrease in the formation of dental calculus.

In light of this background, there remain needs for products and methods for promoting oral health in domestic companion animals such as cats and dogs. The present invention is addressed to these needs.

SUMMARY OF THE INVENTION

Accordingly, in one aspect, the present invention provides chew products designed for mastication by domestic animals, which incorporate a combination of an anti-microbial agent and an anti-calculus agent. Specifically, one embodiment of the invention provides an article useful in decreasing the formation of dental calculus in a domestic animal comprising a chew product including sodium tripolyphosphate (STP) and cetyl pyridinium chloride (CPC) or another suitable cetyl pyridinium salt.

In another aspect, the present invention provides methods for providing oral care to a domestic animal, such methods including providing to the animal for mastication a product of the invention as described above.

Another embodiment of the invention provides a method for manufacturing a product as described above, comprising providing an ingestible chew substrate, and incorporating STP and CPC or another cetyl pyridinium salt on or in said substrate.

Still another embodiment of the invention provides an article of manufacture that comprises a package and one or more inventive chew products as described herein.

It is an object of the present invention to provide chew products useful for decreasing the formation of dental calculus in a domestic animal.

It is another object of the invention to provide methods useful for decreasing the formation of dental calculus in a domestic animal.

Additional objects and advantages of the present invention will be apparent from the descriptions herein.

DETAILED DESCRIPTION

For the purposes of promoting an understanding of the principles of the invention, reference will now be made to the preferred embodiments illustrated in the following description and examples, and specific language will be used to describe the same. It will nevertheless be understood that no limitation of the scope of the invention is thereby intended, such alterations and further modifications in the preferred embodiments of the invention, and such further applications of the principles of the invention as described therein being contemplated as would normally occur to one skilled in the art to which the invention relates.

The present invention provides a variety of chew products, which incorporate sodium tripolyphosphate (STP) and cetyl pyridinium chloride (CPC). STP and CPC, when incorporated together into such products, have been found to reduce the build-up of dental calculus on the teeth of animals and the occurrence of gingivitis.

The term chew products is used herein to refer to items which are intended for chewing by an animal for an extended period of time and have as one of their primary functions the removal of dental plaque through the normal mastication process. Such chew products typically have a useful life of a minute to several hours, and thus the chew product and related method as contemplated herein provides for contact of the STP/CPC-containing product with the teeth of an animal to be treated for an extended period of time, e.g., at least about 1 minute, and typically in the range of about 1 minute to 1 hour or more. The term chew products does not include products having the primary purpose of serving as food, such as dry dog food or dog biscuits. Thus, the chew products include, for example, rawhide materials as well as other materials known in the art to be suitable and intended for chewing by a domestic animal.

A preferred chew product for use with the present invention is a rawhide product. Generally, such products and methods for their preparation are known in the art. Exemplary procedures for the preparation of rawhide materials are disclosed for example in U.S. Pat. No. 5,047,231, issued on Sep. 10, 1991 and U.S. Pat. No. 6,223,693 issued on May 1, 2001. Rawhide products can be prepared in a dried form. To do so, rawhide can be combined with solution(s) of ingredients to be incorporated with the rawhide and then dried. The rawhide material may be in any shape that can be chewed. Examples of such rawhide shapes are strips, balls made up of pieces or strips, knotted strips, bones made up of pieces or strips, curled pieces, etc. The rawhide also can be that which has been molded (e.g., compressed, extruded, stamped, tabletted, etc.) and formed.

The chew products are provided with an effective amount of a combination of STP and CPC for delivery to the teeth and adjacent oral cavity tissues of the animal upon chewing the product. In this regard, the STP and CPC can be incorporated into the product separately, or together. As well, one or both can be incorporated in a coating on the product, or within the body of the product, e.g. as a substantially homogenous mixture within the product.

In one illustrative preparation, a soft rawhide product is prepared from chopped rawhide particles. For example, such products are typically formed with bits of rawhide of generally less than ¼ inch in diameter, which are bound together, generally with the help of a binder substance. For example, the chopped rawhide can be mixed with water, CPC, STP and any other materials (e.g. a binder such as gelatin) to be incorporated into the chew product. Other materials that may optionally be incorporated into such a mixture and the final product include colors, flavors or scents. The mixture is then formed into desired shapes, advantageously by extrusion, molding or other suitable methods, and various shapes of soft, sanitary rawhide articles can be obtained.

The STP and CPC will be incorporated in effective amounts to promote oral health in the animals that will masticate the product. STP is generally incorporated in an amount that is effective to reduce the formation of dental calculus on the teeth of an animal chewing the product. The CPC is generally incorporated in an antimicrobially effective amount and desirably an amount that is effective to significantly reduce gingivitis in the oral cavity of an animal chewing the product. Naturally, the amount desired will vary with the effect being sought. Also, the amount that will be found effective may vary with the nature of the chew product and the species of animal (e.g. dog or cat) chewing the product. By way of non-limiting example, the chew product may include about 0.01% to about 0.10% by weight of CPC, more typically about 0.03% to about 0.05%; and, the chew product may include about 0.2% to about 2% of STP, more typically about 0.6% to about 0.9%. It will be understood that antimicrobial cetyl pyridinium salts other than CPC can be used instead of or in addition to CPC, in amounts as specified for CPC above or other amounts suitable for the desired antimicrobial activity. Illustrative candidates include other cetyl pyridinium halide salts, such as the bromide salt.

Commercial articles can be provided by including one or more of the inventive animal chew products, and preferably a plurality of the inventive animal chew products, into a sanitary package. The package can include indicia reflecting the type of animal(s) for which the chew product is designed, e.g. a cat and/or dog, and that the chew product is effective for providing oral care to the animal, e.g. in reducing dental calculus and/or gingivitis.

Further understanding of the present invention is provided in the following examples, which are intended to demonstrate the use and efficacy of the inventive methods and products, and are not to be considered as restrictive in nature.

EXAMPLE 1

In Vitro Testing

TSA agar plates were individually swabbed with fresh 24-hour broth cultures of *Streptococcus mutans*, *Streptococcus sanguis* and *Streptococcus parasanguis* to provide a confluent lawn of bacterial growth. Five minutes after swabbing the plates (to allow the inoculum to absorb into the agar), 20 microliters of each test material (see below) was placed onto designated places on the plates and allowed to absorb into the agar. The plates were then incubated, agar-side up, at 37° C. in 5% $CO_2$ for 48 hours. The agar plates were examined at 24 and 48 hours for zones of inhibition of growth for each bacterial species. The diameter of each zone was measured and reported in mm. The zones of inhibition of each mixture (anti-calculus and antimicrobial products) were compared to the zones of each product separately. If the zones of the mixtures were the same size (or larger) than the inhibition zones from the antimicrobial product alone then there would be judged to be no inhibition of antimicrobial activity by the anti-calculus product. The test solutions were: (a) cetyl pyridinium chloride (CPC; 0.04%)—alone and mixed with STP; and (b) sodium tripolyphosphate (STP; 0.72%)—alone and mixed with 0.04% CPC. The results are set forth in Table 1.

TABLE 1

| Experimental | Zone of Inhibition (mm) | | |
|---|---|---|---|
| Treatment | S. mutans | S. sanguis | S. parasanguis |
| Deionized Water | 0 | 0 | 0 |
| STP (0.72%) | 6 | 0 | 8 |

TABLE 1-continued

| Experimental | Zone of Inhibition (mm) | | |
|---|---|---|---|
| Treatment | S. mutans | S. sanguis | S. parasanguis |
| CPC (0.4%) | 16 | 15 | 24 |
| CPC (0.4%) + STP (0.72%) | 13 | 10 | 25 |

As these results demonstrate, STP had little antimicrobial activity while the CPC exerted significant antimicrobial activity as evidenced by larger zones of microbial inhibition. Importantly, these results indicate that the antimicrobial activity of CPC is not appreciably diminished by the combination with STP.

EXAMPLE 2

Clincal Experiment

Protocol

A clinical study was conducted in a veterinary practice as a three-way crossover test with 4-week test periods and the test or placebo treats were provided as one piece daily in addition to dry food rations. The study was initiated with 12 small dogs (all Chihuahuas). 7 dogs completed all three legs of the study; animal attrition during the study period was not related to any of the experimental regimens (owners elected to breed dogs and they were withdrawn from the study). The vehicle for the active system was a soft rawhide prepared from extruded rawhide designed for small dogs (toy breeds). The vehicle was impregnated with 0.04% CPC and 0.72% STP. The study was designed as a double blind, crossover study comparing three regimens: (a) dry chow diet with no daily rawhide treat; (b) dry chow diet with daily supplementation of one piece of soft rawhide; and (c) dry chow diet similarly supplemented with one piece of STP-CPC-impregnated soft rawhide daily.

At the initiation of each 4-week test period the dogs were anesthetized and given a complete dental prophylaxis (teeth cleaning) to remove all dental plaque and dental calculus. They were then assigned to one of the two experimental regimens and were provided the required quantities of the dry chow diet (Purina Chow Little Bites) with or without a 30-day supply of the placebo or experimental soft rawhide and the appropriate instructions with a chart to record consumption. The dogs designated to receive the experimental product were given one 6-inch roll (21 grams) daily approximately 4 hours after feeding the basal diet. Following the 4-week test period the dogs were examined for the presence of dental plaque, dental calculus, gingivitis and malodor by trained and established clinical examiners. The malodor assessment used an instrument (Halimeter) to quantify the presence of sulfur compounds in their breath. Blood samples were drawn and sent to a commercial laboratory to determine the safety of the experimental regimen. Immediately following the clinical examinations, the dogs were given a second dental prophylaxis, provided the appropriate alternative regimen and examined again following another 4-week test period.

Results

Table 2 below summarizes the data regarding the effectiveness of the treatments. The three test regimens were: (1) No Treat; (2) Soft CPC-STP-Coated Rawhide; and (3) Placebo Soft Rawhide. The results are presented using two different types of teeth: the whole mouth and the so-called chewing teeth (molars and premolars).

TABLE 2

| | Dental Plaque | | Gingivitis | | Calculus | |
|---|---|---|---|---|---|---|
| Test Regimen | Mean | % Red. | Mean | % Red. | Mean | % Red. |
| All Teeth Examined | | | | | | |
| No Treat | 6.03 | — | 0.81 | — | 2.58 | — |
| CPC-STP Treat | 4.17 | 30.8 | 0.58 | 28.4 | 1.18 | 54.3 |
| Placebo Treat | 4.33 | 28.2 | 0.69 | 14.8 | 1.23 | 52.3 |
| Chewing Teeth | | | | | | |
| No Treat | 6.87 | — | 0.73 | — | 1.88 | — |
| CPC-STP Treat | 3.42 | 50.2 | 0.44 | 39.7 | 0.54 | 71.3 |
| Placebo Treat | 3.67 | 46.6 | 0.57 | 21.9 | 0.63 | 66.5 |

As can be ascertained from the above results, both soft rawhide treat regimens resulted in decreases in dental plaque, gingivitis and dental calculus; the benefits from the placebo rawhide were substantially greater (about two-fold) than that typically observed with conventional rawhide products, and in these experiments appear to have masked some of the benefits of the CPC-STP system particularly on dental plaque and dental calculus. Although not included in Table 2, reductions in mouth odor were 10.3% and 19.6% for the placebo treat and the CPC-STP treat regimens, respectively. The CPC-STP combination was effective to reduce gingivitis at clinically and statistically significant levels. The benefits of the test and placebo regimens were greater on the so-called chewing teeth.

While the invention has been illustrated and described in detail in the foregoing description, the same is to be considered as illustrative and not restrictive in character, it being understood that only the preferred embodiments have been described and that all changes and modifications that come within the spirit of the invention are desired to be protected. In addition, all publications cited herein are indicative of the abilities possessed by those skilled in the art and are hereby incorporated herein by reference as if each had been individually incorporated by reference and fully set forth.

What is claimed is:

1. A dog chew product, comprising:
   an ingestible rawhide substrate;
   cetyl pyridinium chloride and sodium tripolyphosphate incorporated on or in said ingestible rawhide substrate;
   wherein said ingestible rawhide substrate, cetyl pyridinium chloride and sodium tripolyphosphate are provided in a dried rawhide dog chew product, and said cetyl pyridinium chloride and sodium tripolyphosphate are incorporated in amounts wherein the cetyl pyridinium chloride and sodium tripolyphosphate are together effective to reduce the incidence of both gingivitis and dental calculus in a dog that chews the dried rawhide dog chew product.

2. A dog chew product of claim 1, wherein:
   the sodium polyphosphate is the only anti-calculus agent incorporated on or in said rawhide substrate.

3. A dog chew product of claim 2, wherein said rawhide substrate comprises a body formed from multiple rawhide pieces.

4. A dog chew product of claim 3, wherein said body also comprises a binder.

5. A dog chew product of claim 3, wherein said sodium tripolyphosphate and cetyl pyridinium chloride are incorporated within said body.

6. A dog chew product of any of claims 1-5, wherein said chew product incorporates about 0.01% to 0.10% by weight of cetyl pyridinium chloride.

7. A dog chew product of claim 6, wherein said chew product incorporates about 0.2% to about 2% by weight of sodium tripolyphosphate.

8. A dog chew product of claim 1, wherein said sodium tripolyphosphate and cetyl pyridinium chloride are incorporated in a coating on said ingestible chew substrate.

9. A dog chew product according to claim 1, wherein the cetyl pyridinium chloride is the only anti-microbial agent incorporated on or in the rawhide substrate.

10. A dog chew product according to claim 9, wherein the sodium tripolyphosphate is the only anti-calculus agent incorporated on or in the rawhide substrate.

11. An article of manufacture, comprising a package containing one or more dog chew products of claim 1.

12. A method for oral care in a dog, comprising providing to said dog for mastication a dried rawhide chew product comprising an ingestible rawhide substrate and cetyl pyridinium chloride and sodium tripolyphosphate incorporated on or in said ingestible rawhide substrate, wherein the cetyl pyridinium chloride and sodium tripolyphosphate are incorporated in amounts wherein the cetyl pyridinium chloride and sodium tripolyphosphate are together effective to reduce the incidence of gingivitis and dental calculus in a dog that chews the dried rawhide chew product.

13. A method of claim 12, wherein said providing comprises providing one or more of said dried rawhide chew products to the dog per day.

14. A method of claim 12, wherein the sodium tripolyphosphate is the only anti-calculus agent incorporated on or in the rawhide substrate.

15. A method of claim 14, wherein the cetyl pyridinium chloride is the only anti-microbial agent incorporated on or in the rawhide substrate.

16. A method for manufacturing a dog chew product, comprising:

providing an ingestible rawhide substrate;

incorporating sodium tripolyphosphate and cetyl pyridinium chloride on or in said substrate so as to provide a wet, agent-treated substrate; and drying said wet, agent-treated substrate to provide a dried rawhide chew product;

wherein said cetyl pyridinium chloride and sodium tripolyphosphate are incorporated on or in said substrate in amounts wherein the cetyl pyridinium chloride and sodium tripolyphosphate are together effective to reduce the incidence of gingivitis and dental calculus in a dog that chews the dried rawhide chew product.

17. A method of claim 16, which comprises incorporating sodium tripolyphosphate and cetyl pyridinium chloride in said substrate.

18. A method of claim 17, wherein said incorporating comprises:

providing a mixture containing sodium tripolyphosphate, cetyl pyridinium chloride and a material for forming said ingestible rawhide substrate; and forming said ingestible rawhide substrate from said mixture.

19. A method of claim 16, which comprises incorporating sodium tripolyphosphate and cetyl pyridinium chloride in a coating on said substrate.

20. A method of claim 16, wherein the sodium tripolyphosphate is the only anti-calculus agent incorporated on or in the rawhide substrate.

21. A method of claim 20, wherein the cetyl pyridinium chloride is the only anti-calculus agent incorporated on or in the rawhide substrate.

22. A dog chew product according to claim 1, wherein said ingestible rawhide substrate comprises a chewable body formed with bits of rawhide, and said sodium tripolyphosphate and cetyl pyridinium chloride are incorporated substantially homogenously within said chewable body.

* * * * *